United States Patent [19]

Walter et al.

[11] Patent Number: 4,611,101

[45] Date of Patent: Sep. 9, 1986

[54] METHOD AND APPARATUS FOR TESTING COMMUNICATION SYSTEMS

[75] Inventors: Michael D. Walter, Webster; Mark R. Grundtisch, Rochester, both of N.Y.

[73] Assignee: TII Computer Systems, Inc., Copiague, N.Y.

[21] Appl. No.: 645,479

[22] Filed: Aug. 29, 1984

[51] Int. Cl.[4] .......................................... H04B 3/46
[52] U.S. Cl. ............................................ 179/175.3 R
[58] Field of Search ......... 179/175.3 R, 175, 175.2 C, 179/175.2 d, 175.3 R; 371/22; 370/14

[56] References Cited

U.S. PATENT DOCUMENTS 3,842,218 10/1974 DeLuca et al. ............. 179/175.3 R
3,969,594 7/1976 DeLuca et al. ............. 179/175.3 R
4,446,341 5/1984 Rubin ........................... 179/175.3 F

OTHER PUBLICATIONS

Installation Guide, 4T-880, Manual Part, No. 997-880-00, Jul 1981, Teradyne, Inc.
Microcomputer Interactive Test System 70, Lardel, 40 pp.
Repair Bureau, Microcomputer Systems, Feb. 1983, 12 pp.
Automatic Line Test Set, Lordel T-9/15, pp. 1, 2, 13 and 25.
4TEL, Automatic Subscriber Loop Test System, Teradyne, pp. 1-18.
LRS-1 Automated Loop Reporting System, Northeast Electronics Instruction Manual, A3798-80601, Issue 1, Jun. 1979, 4 pp.

Primary Examiner—Stafford D. Schreyer
Attorney, Agent, or Firm—Pennie & Edmonds

[57] ABSTRACT

A microcomputer controlled apparatus and method for testing communication lines including circuits serving multiple functions in the measurements of line electrical and noise characteristics. A current divider, an analog to digital converter, a constant current source, various filters and an RMS-to-DC converter are used to perform A.C. and D.C. voltage and current measurements, resistance measurement and noise measurement. Capacitance measurement circuits and method utilize a buffer for isolating the capacitance on the wire measured from other capacitance sources.

14 Claims, 9 Drawing Figures

METHOD AND APPARATUS FOR TESTING COMMUNICATION SYSTEMS

BACKGROUND OF THE INVENTION

This relates to the maintenance and testing of communication lines and, in particular, to the maintenance and testing of conventional telephone lines.

Communication lines require periodic testing, maintenance and repair. At first, telephone system operators employed an entirely manual process of accessing, testing and servicing subscriber lines. However, these manual procedures frequently resulted in a substantial delay between the initial report of trouble on a line and the verification and identification of that trouble. Thus, a rapid, accurate and intelligent response to a trouble report or a subsequent inquiry was impossible in the majority of circumstances. In addition, the speed and accuracy of certain line tests depended on the experience of the tester and upon how quickly information about the subscriber's telephone equipment could be manually retrieved from a file; and the whole process was very much labor intensive.

In an effort to acquire better line testing, maintenance and repair capabilities, in the 1970's American Telephone and Telegraph, Inc. developed and implemented Automatic Repair Service Bureaus (ARSBs) in the predecessors of the Regional Bell Operating Companies (RBOCs). See P. S. Boggs and M. W. Bowker, "Automated Repair Service Bureau: Evolution", *Bell System Technical Journal*, Volume 61, No. 6, Part 2, pp. 1097–1114 (July-August, 1982). The ARSBs utilized a Loop Maintenance Operating System (LMOS) and a Mechanized Loop Testing (MLT) system.

LMOS provides four basic services to the ARSBs. First, the system generates and maintains a data base containing very detailed information, such as the identity of the telephone equipment in use at a subscriber's site, the electrical characteristics of this equipment, whether there are any unresolved reports of trouble on the line, and whether the subscriber's account shows an unpaid balance.

Second, LMOS performs computerized trouble report processing. When a trouble on a line is reported by a subscriber, an entry is made in the applicable line record. The telephone company employee receiving the subscriber's call can then use the MLT system, described below, to perform some preliminary tests on the line and verify or discount the report. If the tests disclose no line trouble, the employee will inform the subscriber that the line is in working order and make an entry in the line record reflecting that fact. Alternatively, if the test results indicate that a trouble does exist, the employee's entry will indicate that further testing by the MLT system is required. Thus, LMOS allows the existence and status of a pending trouble report to be readily determined.

The third basic service provided by LMOS involves the generation of management and analysis reports utilizing the information stored in its data base. These reports include analyses of the ARSBs' efficiency and the prediction and identification of problem areas in repair operations.

Finally, because LMOS keeps track of repair force locations and commitments, the system allows for efficient repair force deployment. This is particularly important when a subscriber is requested to remain at a site for repair operations.

An MLT system essentially performs computer controlled tests on the communication lines and interprets the results of those tests. These tests may be performed as a response to a subscriber's trouble report, or alternatively, as part of an automatic testing and maintenance program. The MLT system obtains information about the normal electrical characteristics of a subscriber's line from the LMOS date base and uses it to generate a series of adaptive tests in order to determine the current status of the line. For example, the subscriber may use what is referred to as "inward-only" service, in which outgoing calls on the line are not permitted, and thus no dial tone is provided. There would be little point in running a test to detect a dial tone on such a line. In addition to information about the subscriber's termination equipment, LMOS also contains data describing central office equipment and outside plant equipment on the line. This data is also required for meaningful MLT testing.

MLT accesses selected lines at and through communication test head hardware. Preliminary tests are performed to ascertain whether a given line is available for testing, including for example, whether the line is on intercept, whether it is currently in use (busy signal test) and whether the voltage on the line is hazardous to the testing equipment. If the line is available, MLT performs a series of diagnostic tests designed to determine the line's operational status. These tests typically include measurements of AC and DC voltage and current, resistance, and capacitance, dial tone detection, dial pulse and DTMF tests, a noise check and an off-hook test. In addition, the MLT system can detect the existence of an open wire and determine the location of the break.

MLT then interprets the results of these tests in accordance with information acquired from the LMOS data base. Frequently, these results can be used to respond to a subscriber trouble report or inquiry while he is still on the line. In addition, a detailed analysis of the test results can be routed to repair service personnel to enable repair operations to be accomplished quickly and efficiently.

Because of cost and efficiency considerations, however, present implementations of the MLT systems are best suited for use only where the number of lines to be served exceeds 10,000. Each MLT currently relies extensively on the processing power of a single minicomputer, and failure of that machine results in a total failure of the MLT system. Furthermore, present MLT systems require as many as five or six circuit boards to contain the components dedicated to actual line testing.

SUMMARY OF INVENTION

Instead of a minicomputer, the present invention employs a microcomputer to control the majority of the testing operations performed upon communication lines. This microcomputer, comprising a microprocessor, I/O, memory and decoders, generates control signals to control testing by various testing circuitry. Software running on the microcomputer is table driven, where entries in the table instruct the microprocessor to operate specific circuits and switching devices.

Latch devices, which are loaded and read using an address bus, a data bus and a buffer bus, maintain and supply control signals to the testing circuitry. Testing is performed using circuits for measuring AC and DC voltage, current, resistance and capacitance, as well as components which allow tone generation and detection, noise detection, and other tests.

One advantage of the present invention is that a very small number of circuits perform numerous tests on communication lines. Under microprocessor control, a voltage divider, a current divider, a constant current source, an A/D converter and an RMS to DC converter are used to determine D.C. voltage and current, resistance, and A.C. voltage and current on said lines. C-weighting, bandpass and notch filters, used in conjunction with the above circuits, measure noise characteristics and a dial tone detecting circuit senses the presence of a dial tone.

In addition, capacitance on a communication line is measured by examining phase lag and amplitude loss introduced by said capacitance into a test tone. A buffer circuit permits the apparatus to measure capacitance on one wire of a communication line independent of the capacitance due to a second wire which is ordinarily coupled thereto.

These tests are performed by channelling signals along various signal paths whereby signals are selectively switched to the above listed components.

It is a further advantage of the invention that all the elements comprising the testing apparatus can fit on one circuit board, thus minimizing complexity and increasing reliability of the testing unit and any systems constructed therewith.

In the presently preferred embodiment, this testing apparatus is interfaced with a supervisor unit that oversees the line testing and processes the test results and with a test trunk access (TTA) unit that accesses the lines to be tested. The supervisor unit is described in detail in the international application entitled "Method and Apparatus for Supervising the Testing and Accessing of Communication Systems," international publication No. WO 86/01662, Mar. 13, 1986, and the TTA unit is described in the international application entitled "Method and Apparatus for Accessing Communication Systems," international publication No. WO 86/01664, Mar. 13, 1986.

Because units embodying the invented testing apparatus operate independently of each other, the units in service will continue to function undisturbed even if one testing unit should fail. In addition, distributing testing, line access and supervisory control functions between testing, TTA and supervisor units provides a system that operates efficiently yet remains adaptable.

BRIEF DESCRIPTION OF THE INVENTION

These and other objects, features and advantages of the invention will be more readily apparent from the following detailed description of the preferred embodiment of the invention in which.

DETAILED DESCRIPTION OF THE PREFERRED EMBODIMENT

Figure 1:
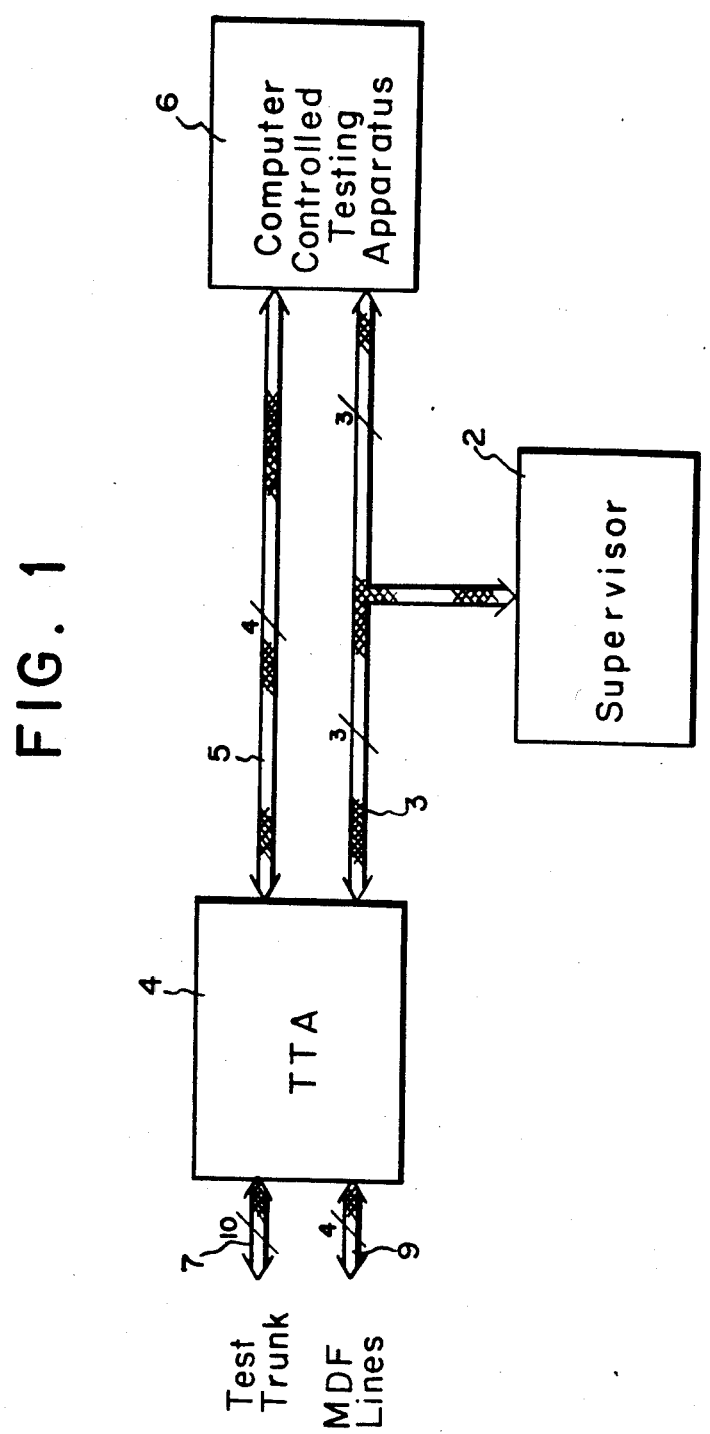
FIG. 1 is a block diagram showing the presently preferred embodiment of the invented testing apparatus in use with supervisor unit and test trunk access unit.

As shown in FIG. 1, a complete system for maintenance and testing of communication lines comprises a a supervisor unit 2, a test trunk access (TTA) unit 4 and a testing unit 6. Both the supervisor and TTA units are described in detail in the above-referenced application "Method and Apparatus for Supervising the Testing and Accessing of Communication Systems," and "Method and Apparatus for Accessing Communication Systems."The supervisor is connected to the testing unit and to the TTA unit by a serial synchronous interface using a three-wire line 3. The TTA unit is connected to the testing unit by a four-wire line 5. When a given communication line wire pair is to be tested, the supervisor unit instructs the TTA, over line to access the pair using ten-wire test trunk line 7 or four-wire MDF line 9. The details of the supervisor-TTA interaction and the seizure of a lines by the TTA are extensively described in the above referenced application entitled "Method and Apparatus for Maintaining Communication Systems".

When the TTA seeks to access lines, the unit may perform some preliminary tests to determine whether the lines can be seized. If possible, the TTA unit seizes the selected communication line(s), couples them to four-wire line 5, and informs the supervisor that a successful line seizure has occurred. The supervisor, through three-wire line 3, then instructs the testing unit to test the seized line(s) using line 5 coupled thereto. The testing unit notifies the supervisor unit when testing is completed and transmits the test results to said unit over line 3. The supervisor software then performs any further calculations required to determine line characteristics.

Figure 2:
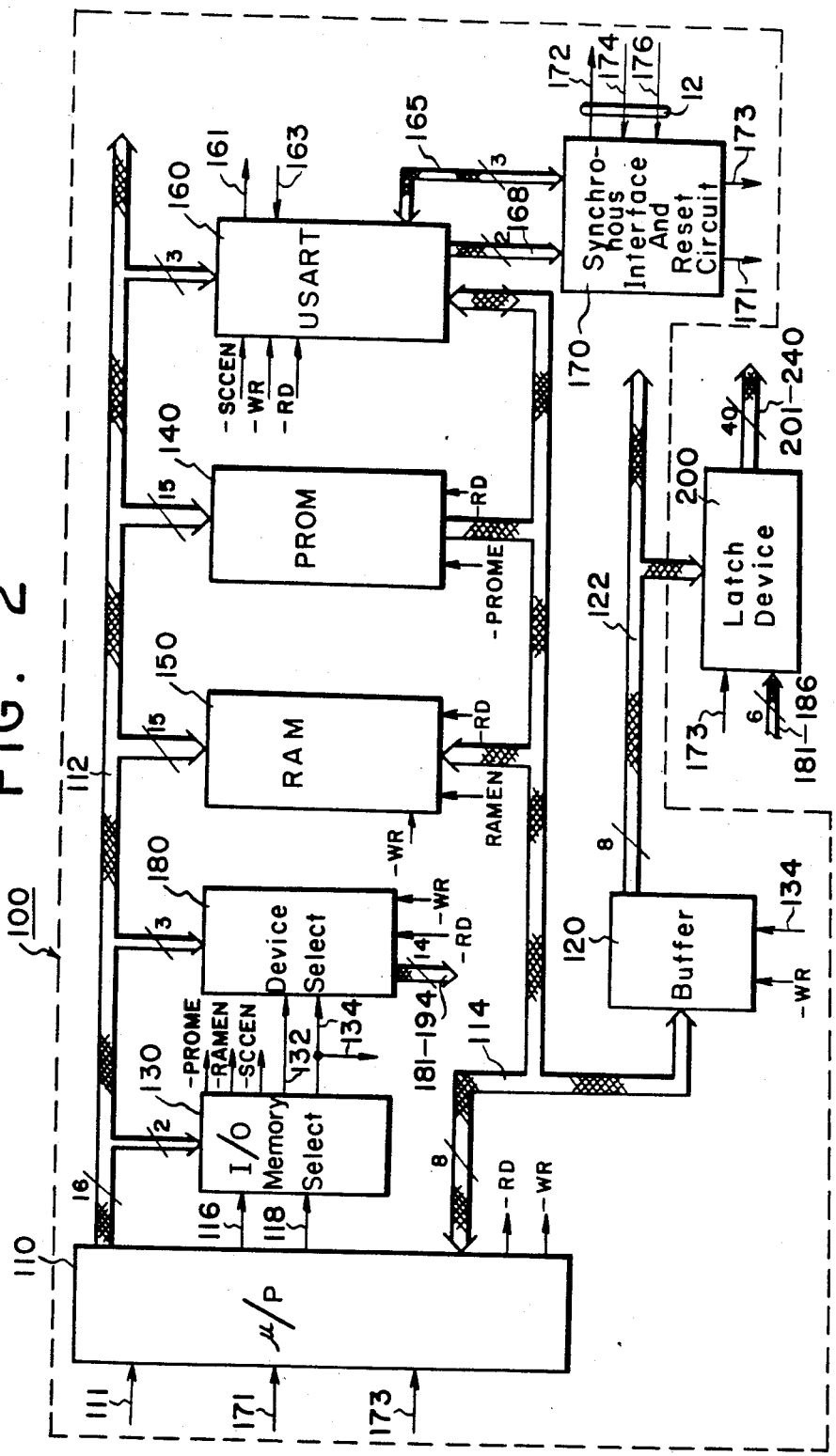
FIG. 2 is a block diagram of a microcomputer of the presently preferred embodiment, including memory, decoders, a buffer, and interconnecting busses.

Details of testing unit 6 are shown illustrated begining with FIG. 2. A microcomputer 100 comprises a microprocessor 110, a buffer 120, an I/O memory select 130, a read/write (RAM) memory 150, a programmable read only memory (PROM) 140, a dual universal synchronous/asynchronous receiver transmitter (USART) 160, a synchronous interface and reset circuit 170, and a device select 180. Also shown in FIG. 2 is a control latch 200 for supplying control signals to various devices in the apparatus. These elements are interconnected by eight-bit bidirectional data and buffered data busses 114, 122, an address bus 112, and various control lines.

Microprocessor 110 in the presently preferred embodiment is a Z-80 chip, but it should be noted that several other devices can successfully serve as the microprocessor unit. Clock pulses, illustratively at 1.92

MHz, drive the Z-80 microprocessor through line 111. The microprocessor uses address bus 112 to select the devices it seeks to communicate with and inputs and outputs data through bidirectional data bus 114. Buffer 120, illustratively a 74245 device, is interposed between data bus 114 and a buffered data bus 122 to reduce load distribution and to isolate I/O devices from components such as memory and communications, thereby increasing system integrity. The buffered data bus is coupled to various devices in the apparatus.

An interrupt and a reset signal are supplied to the microprocessor by lines 171 and 173, respectively, from reset circuit 170.

Read (−RD) and write (−WR) control lines are used by the microprocessor to instruct certain devices to place data on, or accept data from, data bus 114 and buffered data bus 122, and for other control functions.

Read and write control lines, together with 2 lines of address bus 112, memory request line 116 and IO request line 118, are decoded by IO/memory select circuit 130 to provide IO control signals on lines 132 and 134, and PROM enable (−PROME), RAM enable (−RAMEN) and USART enable (−SCCEN) control signals. The presently preferred embodiment utilizes two 74139-type 2-to-4 decoder chips to implement the IO/-memory select circuit 130.

Programmable read only memory (PROM) 140 holds the microprocessor software instructions and provides these instructions to the microprocessor. This software is table driven, meaning that table entries are used in order to generate control signals for operating the circuits in the apparatus. For example, in the presently perferred embodiment, an entry reading 1100 1110 in binary is used to set up for an A.C. volts test. The software causes this value to be written to latch 200 which in turn supplies control signals to certain control lines coupled thereto to relays and other circuits. The PROM may be, for example, a programmable read only memory such as a 2764 or a 27128-type component, and is addressed by 15 lines of the address bus 112. In addition, the microcomputer includes a read/write memory (RAM) 150 of the 6116, 6264, or a similar type, addressed by 15 lines of address bus 112, which permits the microprocessor to store and access data. Both the RAM and PROM chips output data to the data bus 114, and the RAM accepts data from said bus.

A communications interface is provided by a dual Universal Synchronous Asynchronous Receiver Transmitter (USART) 160. The USART is illustratively a Z8530, but other appropriately selected devices are easily substituted. This device provides concurrent synchronous and asynchronous communication The USART receives control signals from two lines of the address bus, the −RD and −WR lines, and the −SCCEN line; and data bus 114 is used to transfer data between the USART and the microprocessor. The serial asynchronous component of the USART includes a transmit data line 161 and a receive data line 163.

Synchronous interface and reset circuit 170 in conjunction with USART 160 provide a serial synchronous interface with the supervisor unit 10, of FIG. 1. Line 172 transmits data to the supervisor and line 174 receives data from the supervisor. A reset signal from the Supervisor is received through line 176. Lines 172, 174 and 176 comprise three-wire line 3 shown in FIG. 1. Note that various implementations of synchronous communication could be employed, such as RS-422 wherein lines 172, 174 and 176 comprise three-wire- pairs. Two wire line 168 supplies status and interrupt signals, respectively, from the microprocessor to the synchronous interface and reset circuit 170. Using signals from lines 168 and 176, the circuit generates control signals which are selectively applied to interrupt line 171 and reset line 173.

Under control of software, devices are selected by the microprocessor for reading, writing and other operations by causing control signals to be applied to device select or 180 through two control lines 132 and 134, read and write lines, and three lines of address bus 112. Device select or 180, which illustratively comprises three 3 to 8 decoder chips of the 74138-type, then decodes these inputs and selectively couples control signals to lines 181 through 194.

Figure 4:
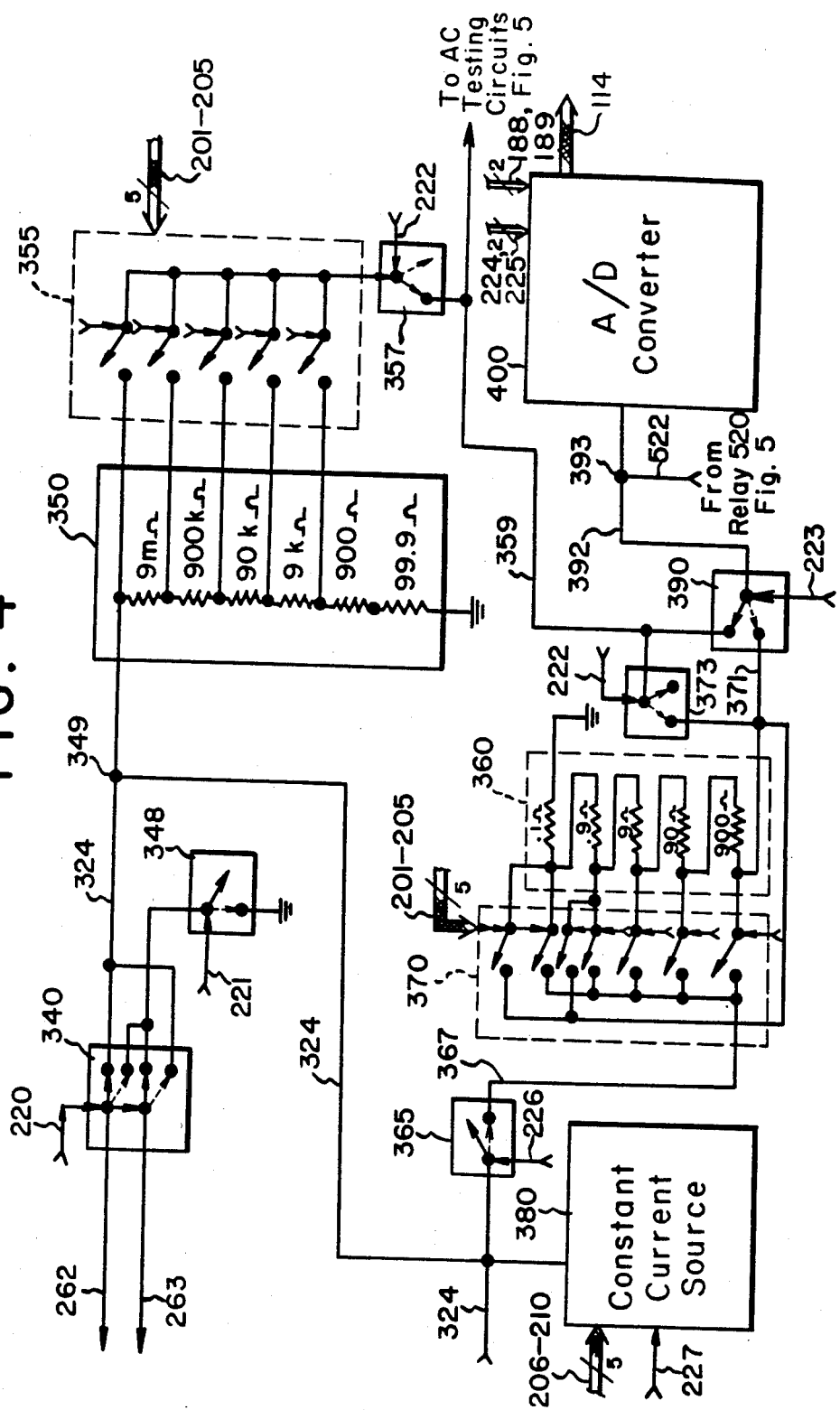
FIG. 4 depicts components for ranging and measuring voltage, current and resistance, and a loop forming circuit.

As will be described below, the apparatus of FIG. 2 is used to control testing of communication lines such as convential telephone lines. Under the control of microprocessor 110, such circuitry can determine the electrical characteristics of a line, including resistance, DC voltage and DC current using a voltage divider circuit 350, a current divider circuit 360, a constant current source 380, and an A/D converter 400, all of which are shown in FIG. 4, and can determine AC voltage and AC current using the above elements in combination with an RMS to DC converter 500, shown in FIG. 5. Noise and speech detection can be performed using several filters along with A/D converter 400 and RMS to DC converter 500 and dial tone can be detected by detection circuit 470 of FIG. 5. In addition, the invented apparatus includes a programmable tone generator shown in FIG. 6 for generating a signal at a variety of frequencies and levels. Finally, a capacitance measurement circuit comprising a phase lag and amplitude loss detection means shown in FIGS. 7 and 8 can be used to measure line capacitance.

Testing by the above mentioned components is accomplished by selectively channelling signals between accessed communication lines and particular measuring components while other such components are bypassed.

Control latch 200, which illustratively is constructed of six 74374-type chips, maintains and supplies the majority of control signals for the above described testing components. Latch 200 is loaded with these control signals from buffered data bus 122 under control of signals on lines 181-186. For example, through latch 200 the microprocessor can cause the test circuitry to range voltage and current divider circuits 350, 360 so that the input to A to D converter 400 is within a predetermined range; it can select a level for a tone to be coupled to communication lines being tested; and it can select a capacitance level for a circuit measuring line capacitance. Specifically, lines 201-205 are used by a voltage divider select circuit 355 and a current divider select circuit 370 to select output sampling ranges of 0.4 V, 4 V, 40 V, 0.4 KV and 4 KV for voltage divider circuit 350 and ranges of 0.4 mA, 4 mA, 40 mA, 0.4 A and 4 A for current divider circuit 360 of FIG. 4. Resistance levels of 200, 2 K, 20 K, 200 K and 2 M ohms, which are used by a constant current source 380, FIG. 4, are selected by control signals on lines 206-210. Further, lines 211-214 provide control signals which select level inputs for level select device 680 in the tone generator shown in FIG. 6, and lines 215-218 select expected capacitance levels for a capacitance select and elimination buffer 720 shown FIG. 7. The remaining lines 219–240 provide signals to control various test operations as detailed below.

Figure 3:
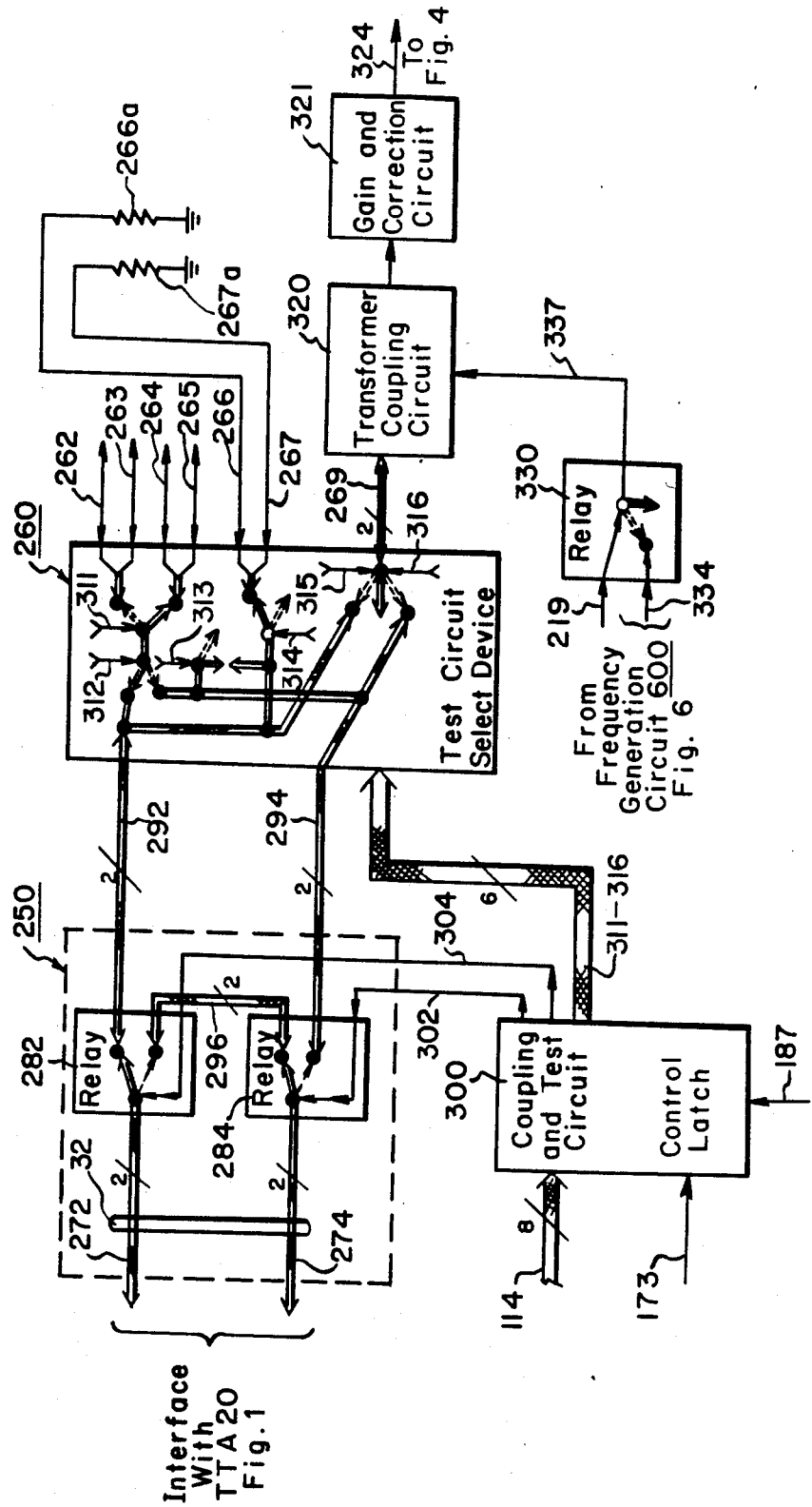
FIG. 3 shows a test bus interface with a TTA unit comprising relays and relay control circuits for coupling the seized communication lines to various test circuits, in addition to a circuit for coupling tones to and receiving tones from said lines.

FIG. 3 shows the apparatus that couples the testing unit to four-wire line 5 and ultimately to the communication lines to be tested. These elements include a TTA interface circuit 250 comprising a test circuit select device 260, wire pairs 272 and 274, double pole, double throw relays 282 and 284, and wire pairs 292 and 294, as well as a control latch 300 for controlling said coupling operation and said test circuit select device. FIG. 3 also shows a transformer coupling circuit 320, which couples two-wire line 269 to a gain and correction circuit 321 and line 324, and couples relay 330 through line 337 to two-wire line 269.

Illustratively, wire pair 272 is externally coupled by TTA unit, 4 of FIG. 1 to subscriber communication lines, and wire pair 274 is similarly coupled to central office or PBX switching equipment. In accordance with conventional practice in telephony, we will refer to one of the wires in a telephone wire pair as tip and the other as ring. Because both the TTA unit and the testing unit have the capability of interchanging the connections to tip and ring, in practice it does not matter which wire of the wire pair is designated tip and which is designated ring. Relay 282 selectively couples wire pair 272 to wire pair 292, and relay 284 similarly couples wire pair 274 to wire pair 294. When wire pairs 272 and 274 are not so coupled to wire pairs 292, 294, they are coupled to each other through wire pair 296.

Coupling and test circuit control device 300, a 74374-type latch, is loaded using data bus 114 and provides signals through lines 302 and 304 to cause selective coupling by relays 282 and 284, respectively. Latch 300 also provides control signals to test circuit select device 260 through lines 311–316.

Circuit select device 260 is constructed using standard relays 311'–315'. The device uses relay 311' and a control signal supplied by line 311 to selectively couple either wire pair 292 or wire pair 294 to a voltage, current and resistance measurement circuit through lines 262 and 263, or to a capacitance measurement circuit through lines 264 and 265, and selects which of said wire pairs are to be so coupled using a relay 312' and an appropriate control signal presented by line 312.

Relay 315' is controlled by lines 315 and 316 selectively couples two-wire line 269 and transformer circuit 320 to wire pair 292 or wire pair 294 or leaves said two-wire line unconnected The transformer coupling circuit 320 decouples the A.C. voltage across wire pair 269 and couples signals from said pair to gain and correction circuit 321 which compensates for the amplitude loss occurring when a signal passes through the transformer by multiplying the amplitude of the signal, illustratively, by a multiple of five. The output of gain and correction circuit 321 is used by various testing and tone detection circuitry such as that shown in FIG. 5. Alternatively, a tone generated by a programmable tone generation circuit 600, FIG. 6, is selectively coupled to transformer coupling circuit 320, and ultimately to the lines to be tested, through relay 330 under control of a signal on line 219.

To permit self-calibration, the wires of pairs 292, 294 can be coupled to ground through precision resistors 266a and 267a, which are illustratively 200 and 2 k ohms, respectively. An appropriate control signal on line 314 causes lines 266 and 267 to be coupled by relay 314' to wire pair 292 which as described above, can be coupled to the voltage, current and resistance measurement circuit thus allowing calibration. In addition, relay 313', when operated by a given control signal on line 313, couples together wire 292 and 294. Thus wire pair 272 can be coupled to said precision resistors through relay 282, wire pair 292, and relay 314', or wire pair 274 can be so coupled through relay 284, wire pair 294 and relays 313' and 314', or both wire pairs 272 and 274 can be coupled to said resistor.

FIG. 4 depicts apparatus used in measuring voltage, current and resistance. This apparatus essentially comprises relay 340, relay 348, voltage divider circuit 350, voltage divider select circuit 355, current divider circuit 360, current divider select circuit 370, relay 373, constant current source 380, and A/D converter 400. Voltage divider circuit 350, current divider circuit 360 and constant current source 380 are well known to persons skilled in the art. Illustratively, the voltage divider is an Ohmtek 100-268 which comprises six series connected resistors having values of 9 M, 900 K, 90 K, 9 K, 900 and 99.9 ohms. The current divider is a Caddock 1787-312 device comprising five series connected resistors having values of 900, 90, 9, 0.9 and 0.1 ohms. Voltage divider and current divider select circuits 355, 370 are easily constructed with commercially available single pole, single throw and double pole, double throw relays.

A/D converter 400 is illustratively an ICL 7109 device that converts an analog signal to a twelve-bit digital value. To obtain this value from the A/D converter, microprocessor 110 must perform two read operations using lines 188, 189 and data bus 114. The first read provides eight out of the twelve bits of the converted valve. The second read provides the remaining four bits, a sign bit and an overrange indication bit. The input voltage range for the A/D converter typically is about 0 to 0.4095 volts, and an overrange condition occurs when a voltage exceeding 0.4095 volts is supplied to the converter.

DC voltage is measured in two configurations tip-to-ground and ring-to-ground, with a third configuration, tip-to-ring being computed therefrom. To measure the DC voltage on lead 262 or lead 263 with respect to ground, that lead is coupled by swapping relay 340 to voltage divider circuit 350 via line 324. As shown in FIG. 4, relay 340 is a double pole, double-throw relay that is controlled by line 220 and is wired so that it can connect either lead 262 or lead 263 to lead 324. Thus, when relay 340 is in one position, the voltage on the tip lead can be measured and when it is in the other position the voltage on the ring lead can be measured. The lead that is not so connected can be connected to ground through relay 348, operated using line 221, or left floating.

The voltage divider circuit comprises a plurality of resistors that are serially coupled to a ground potential. Taps extend from an input node and nodes between the resistors to a voltage divider select circuit 355, the output of which is applied through relay 357, line 359, relay 390 and line 392 to A/D converter 400. Relays 357 and 390 are controlled by lines 222 and 223, respectively. Voltage divider select circuit 355 illustratively has five relays, each connected to one of the taps of the voltage divider circuit and each controlled by one of lines 201–205 from latch 200. For the resistance values given for the Ohmtek 100-268, voltage divider 350 and select circuit 355 enable the microprocessor to divide a voltage on line 324 by divisors of 1, 10, 100, 1000 and 10,000. As a result, any likely line voltage on lead 262 or 263 can be divided down to less than 0.4095 volts, which is the maximum input voltage to A/D converter 400. Selection of the proper divisor (i.e., autoranging) is controlled by the microprocessor which adjusts the divisor depending on the output of the A/D converter.

Relay 357 selectively couples the output of voltage divider circuit 350 to line 359. In the case of D.C. voltage measurements, the signal is coupled to line 359 and supplied thereby to A/D converter 400. A/D converter 400 is controlled by signals on lines 188, 189, 224 and 225 and generates a digital twelve-bit value representing the voltage level of the analog input This value can be read by the microprocessor, under software control, through data bus 114. The software then uses the A/D converter output and the divisor used by the voltage divider to determine the voltage on lead 324.

The highest divisor, 10,000, is not used in the illustrative embodiment, as a voltage of 4095 volts would cause voltage protection devices, not shown, to decouple the testing unit from the accessed line, and thus such a voltage would not be presented to voltage divider 350. For present purposes, therefore, the highest available divisor is 1000.

The method used for autoranging is designed to bring the voltage divider output into an acceptable range as rapidly as possible. The microprocessor first causes voltage divider select circuit 355 to select the second highest available divisor, which in the presently preferred embodiment is 100. If division by 100 nonetheless results in a voltage greater than 0.4095 volts, the maximum input voltage of A/D converter 400, the microprocessor senses the overrange using data bus 114, opens the relay in divider select circuit 355 that selected the second highest available divisor and closes the relay that selects the highest available divisor (1,000 in the preferred embodiment). Alternatively, if the output of the A/D converter is nine percent or less of the maximum possible output, or 0.0369 volts, such a result is considered too low for adequate resolution to be obtained during the conversion process. To correct for this underrange, the microprocessor examines the magnitude of the output of the A/D converter and selects a lower range accordingly. If the A/D output is between one and nine percent of the maximum voltage for the range, the divisor is changed by the microprocessor from 100 to 10 by opening and closing the appropriate relays in voltage divider select circuit. If the A/D converter output is less than one percent of maximum voltage, the divisor is changed by the microprocessor to 1.

Once tip-to-ground (T-G) and ring-to-ground (R-G) D.C. voltages are ascertained, tip-to-ring voltage is computed by subtracting R-G from T-G.

D.C. current is also measured tip-to-ground and ring-to-ground, with the above values being used to compute tip-to-ring current. Current through a tip or ring lead is measured by connecting one of leads 262, 263 through relay 340 to line 324 and relay 365. An appropriate control signal on line 226 causes relay 365 to apply the current on line 324 to current divider select circuit 370 and current divider circuit 360. The current divider comprises a plurality of precision resistors that are connected in series to ground. Taps extend between an input node and nodes between the resistors to current divider select circuit 370. Current divider select circuit illustratively has five relays, each connected to one of these taps and controlled by the microprocessor using one of lines 201–205 from latch 200. In addition, the current divider select circuit also has an output lead 371 connected to the input node and to two additional relays connected to the nodes between the three smallest resistors of the divider circuit. A signal on line 371 is coupled through relay 390 and line 392 to A/D converter 400, or through relay 373 to line 359. Note that both relays 373 and 357 are controlled by line 222, and that said relays are configured such that only one of line 371 or the output of voltage divider 350 can be coupled to line 359 at a time.

Current divider circuit 360 and divider select circuit 370 convert a current on line 367 to a voltage across the precision resistors of the divider; this voltage is determined by the resistor values and relay connections of circuits 360, 370. For the circuit shown in FIG. 4, the microprocessor can select divisors of 1, 10, 100, 1000 and 10,000 by closing the appropriate relays. These values are sufficient to permit any likely current on a tip or ring lead to be converted by divider circuit 360 to a voltage in the range between 0 and 0.4095 volts which is the maximum input range to A/D converter 400. Again, autoranging of the input to the converter is preferably performed by the microprocessor to adjust the voltage output from divider 360 to the appropriate level for input to A/D converter 400.

Resistance measurements of tip-to-ground or ring-to-ground and tip-to-ring resistance are made using constant current source 380, voltage divider circuit 350 and voltage divider select circuit 355. Constant current source 380 is enabled using line 227 and illustratively comprises a voltage source, a FET switch, and five resistors, having resistances of 200, 2 K, 20 K, 200 K, and 2 M ohms. Using the FET switch constant current source 380 has the capability of switching said resistor values under microprocessor control by lines 206-210 so as to produce various constant current levels on line 324. The generated current is then passed over line 324 to node 349.

Under ordinary circumstances, the tip-to-ground and ring-to-ground resistance values should be extremely high, i.e. in the megaohm range. However, a variety of conditions, such as leakage across the tip-to-ring coupling at subscriber termination equipment or water on transmission lines, yield lower resistance measurements. Resistance measurements are made by using equivalent circuits to represent resistances between tip and ground (R1), ring and ground (R2) and tip and ring (R3).

As detailed below, measurements are taken in three configuratations T-G; R-G; and T-R, and the actual resistance values between tip and ground, ring and ground and tip and ring can be algebraically derived from the results obtained by the above said measurements.

To measure resistance in the tip-to-ground (T-G) configuration, the constant current is coupled through relay 340 to the tip, while the ring lead is coupled to ground. As a result, a parallel circuit is formed having one path that extends from node 349 over lead 324, through relay 340 and the tip lead to ground and a second path that extends from said node over line 324, relay 340, and the tip lead to the ring lead and eventually to ground. The voltage at node 349 is then measured by A/D converter and supplied to the microprocessor. A ring-to ground (R-G) voltage value is obtained by applying the constant current to ring while coupling the tip lead to ground.

Note that the voltage values obtained as indicated do not reflect the actual resistances between tip and ground and ring and ground. For example, current applied to the tip node (T) of the delta model shown above divides, in accordance with Ohm's Law, between the T-G and T-R legs. Similarly, current applied to the ring (R) node divides between the R-G and T-R legs. It is necessary, therefore, to make a third measurement with the tip and ring leads of the wire pair shorted together, whereby the resistance between tip and ring is eliminated. This shorting operation could be performed, for example, through the TTA unit or manually. The actual resistance values between tip and ground, ring and ground and tip and ring can then be algebraically derived using the equations shown below.

$$\frac{1}{M1} = \frac{1}{T-G} = \frac{1}{R1} + \frac{1}{R3}$$

$$\frac{1}{M2} = \frac{1}{R-G} = \frac{1}{R2} + \frac{1}{R3}$$

$$\frac{1}{M3} = \frac{1}{T-R} = \frac{1}{R1} + \frac{1}{R2}$$

The testing apparatus determines AC voltage and current using essentially the same circuits and method used to measure D.C. voltage and current. For A.C. voltage measurements, the signal to be tested is coupled by line 359 to relay 480 and through said relay to RMS-to-DC converter 500, FIG. 5, before being presented via relay 520 and line 522 to A/D converter 400. A.C. current measurements are made by selectively coupling the signal output of current divider 370 to line 359 through relay 373, and then to RMS-to-DC converter 500, and A/D converter 400 as described above.

RMS-to-DC converter 500 illustratively is a conventional device such as an AD636JD and converts an AC signal received over line 481 into a DC signal having a voltage level equal to the effective value of the the AC input. The output of this converter is then supplied over line 501 to relay 520, which, when operated by a signal on line 229, causes said converter output to be coupled to line 522. The latter line is coupled to line 392 at node 393, as shown in FIG. 4, and thereby provides the DC signal to A/D converter 400. The A/D converter output is then used to autorange dividers 350, 360 and to compute AC voltages and currents as in the case of DC voltages and currents.

Figure 5:
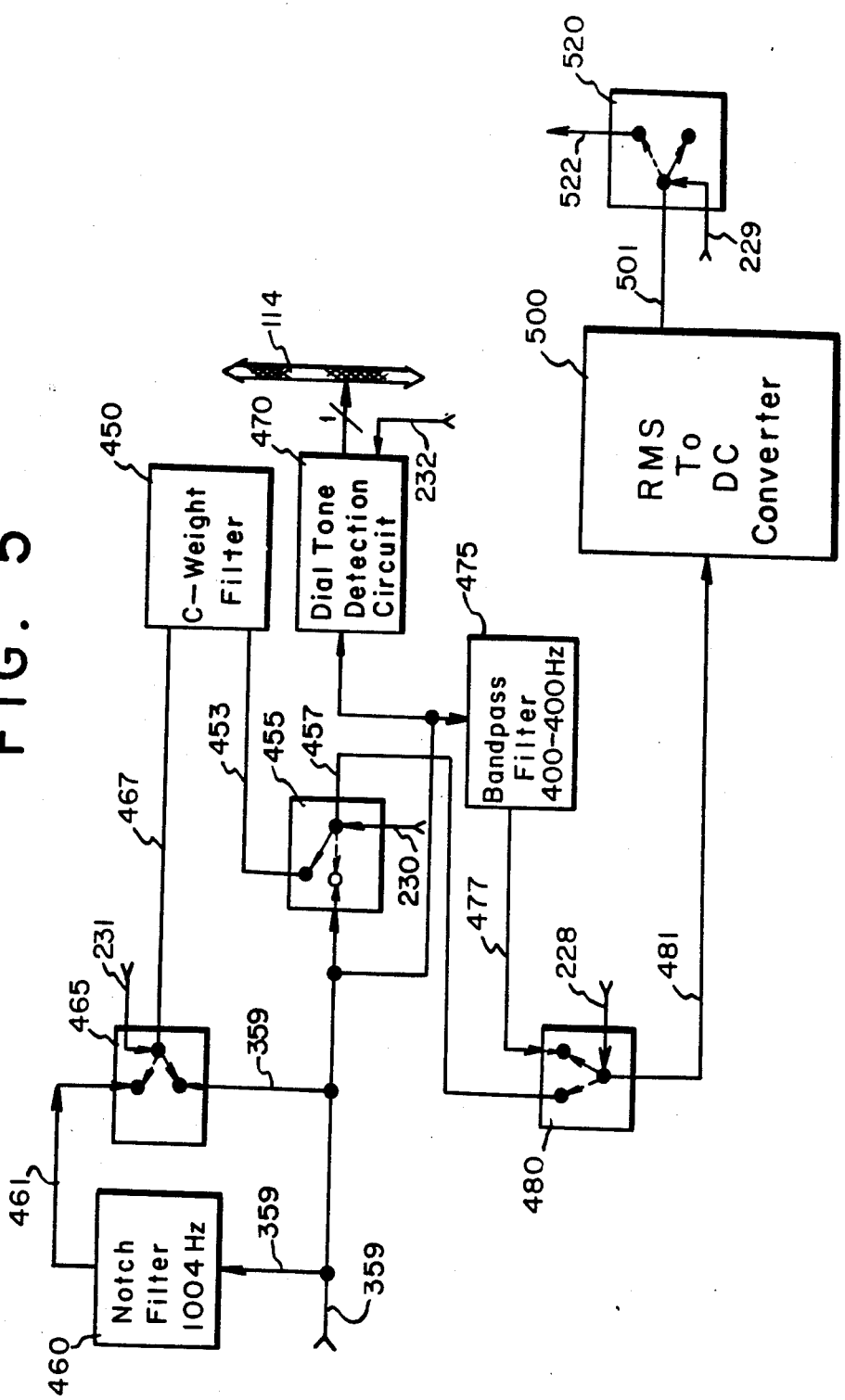
FIG. 5 illustrates circuitry for measuring AC electrical characteristics and for detecting noise and a dial tone.
Figure 6:
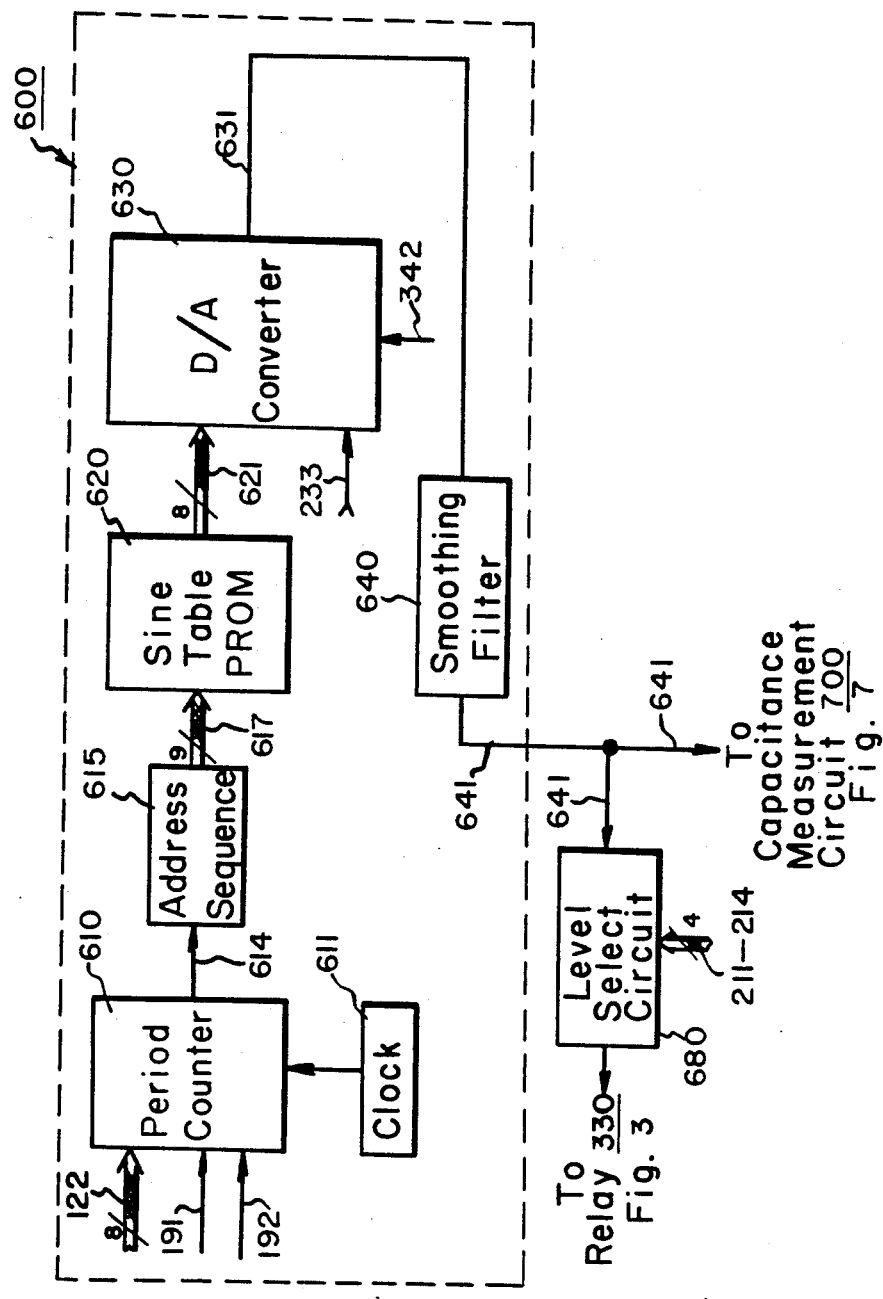
FIG. 6 depicts components for digital frequency synthesis and a FET switch for selecting various tone levels.

Noise and dial tone detection is performed through the use of the components shown in FIG. 5, including a C-weighted filter 450, a notch filter 460, a dial tone detection circuit 470, a bandpass filter 475, RMS to DC converter 500, control lines, and various relays and interconnecting signal transmission lines. C-weighted filter 450 weights the signal so as to approximate the frequency response of a human ear to noise on a telephone line; and bandpass filter 475 eliminates frequencies below 400 Hz and above 4000 Hz, which are outside the band of human speech frequencies that are transmitted over telephone lines. Notch filter 460 selectively eliminates certain tones in a narrow range of frequencies centered around 1004 Hz. Signals from line 359 are selectively passed through or around the above filters by relays 455, 465, and 480, controlled by control lines 230, 231, and 228, respectively, and then supplied to RMS to DC converter 500 over line 491. Dial tones are detected by dial tone detection circuit 470, which examines a signal received from a tip and ring line and tests for a summed 350 and 440 Hz tone.

A signal is applied to the filters of FIG. 5 by connecting transformer coupling circuit 320 of FIG. 3 to either wire pair 272 or 274 using the circuitry described above in connection with FIG. 3. To perform a C-weighted noise test, a control signal on line 231 causes relay 465 to couple the AC signal on line 359 through line 467 to C-weighted filter 450 where the signal is weighted to approximate the frequency response of a human ear to noise on a telephone line. When appropriate control signals appear on lines 230 and 228, the output signal of C-weighted filter is coupled through relay 455 and then provided to RMS to DC converter 500 through relay 480.

RMS to DC converter 500 generates and applies to line 501 an analog DC signal equal to the RMS value of the AC signal received from line 481. When an appropriate control signal is presented to relay 520 by line 229, the DC signal is then passed on line 522 through the relay to A/D converter 400. The microprocessor then reads the digital output of the A/D converter through data bus 114, whereby C-weighted noise can be measured.

Notch noise testing is accomplished by coupling a test tone to the tip and ring leads of a telephone line wire pair, removing the tone from the signal received by the testing unit with a notch filter and then measuring the residual noise.

More particularly, a TTA unit or some other equipment first couples a test tone, illustratively at 1004 Hz to the tip and ring leads of the accessed telephone line wire pair. This pair is then coupled by the circuitry described above in connection with FIG. 3 to transformer coupling circuit 320, which applies the received signal to line 324.

Line 324 supplies the signal through voltage divider circuit 350, voltage divider select circuit 355, and relay 357 to line 359. Appropriate control signals on lines 231, 230 and 228 then cause relays 465, 455 and 480 to couple line 461 to 467, line 453 to 457, respectively. The signal received over line 359, therefore, passes through notch filter 460 where selected frequencies, illustratively in a range centered around 1004 Hz, are removed, then through C-weight filter 450 where the remaining signal is appropriately weighted as discussed above before being presented to RMS to DC converter filter 500. The output of said converter is then supplied, as was the case with ordinary C-weighted noise measurements, to A/D converter 400, FIG. 4, wherefrom microprocessor 110 may read the converted digital value through data bus 114. This value, after it has been autoranged as discussed above, represents the C-weighted residual noise level on the tip and ring lines.

Also shown in FIG. 5 are dial-tone detection circuit 470 and bandpass filter 475. Dial-tone detection circuit 470 is enabled using line 232 and couples a signal to data bus 114 when a summed 350 and 440 Hz tone, the frequency of a dial tone, is detected in the signal provided by line 359. Bandpass filter can be used to eliminate frequencies outside of an illustrative range of 400–4000 Hz, whereby frequencies outside the range of human speech are removed.

FIG. 6 illustrates a programmable tone generation circuit 600 and a level select circuit 680. Programmable tone generation circuit 600 comprises counter 610, which outputs a control signal after counting a given number of clock pulses from clock 611, an address sequencer 615 which supplies consecutive addresses, a sine table PROM 620 which receives said addresses and outputs values stored therein, D/A converter 630, which converts a digital input to an analog signal, a smoothing filter 640 for imparting a regular sinusoidal wave form to a signal, and various interconnecting lines. Level select circuit 680 selects a tone level. In the illustrative embodiment, counter 610 comprises two 74374-type eight-bit latches and four 74163-type counter chips with cascaded outputs, the address sequencer comprises three 74161A devices, the sine table PROM chip is a 2716-type PROM device and contains consecutively stored values used to generate voltage levels comprising a sine wave. D/A converter is an AMD 6081 chip. Smoothing filter 640 is well known to persons skilled in the art, and can be constructed using LF 347 operational amplifiers. Level select circuit 680 illustratively comprises a FET switch and a programmable operational amplifier.

Counter 610 is used to determine the frequency of the generated signal and is loaded under software direction by the microprocessor through buffered bus 122, using control signals on lines 191 and 192. Clock 611, illustratively shown as a 30 MHz clock, supplies clock pulses to the counter. When the counter reaches its terminal count, a control signal is applied to address sequencer 615 by line 614. The sequencer then provides a nine-bit address, through nine-wire line 617, to the sine table PROM 620 containing consecutively stored values, representing in voltage levels a series of discrete points which form a sine wave. When a control signal is present on line 233 the 8-bit value output from the sine table chip is converted by D/A converter 630 into an analog signal and passed by line 632 through a smoothing filter 640. By way of example, the first digital value may result in 0 volts being supplied by the D/A converter. After the converter reaches its terminal count, the second voltage, illustratively +0.5 volts, is then output. As this sequence continues, a sine wave is eventually formed. In this manner, a signal is supplied to line 641 at a frequency determined by counter 610.

Figure 7:
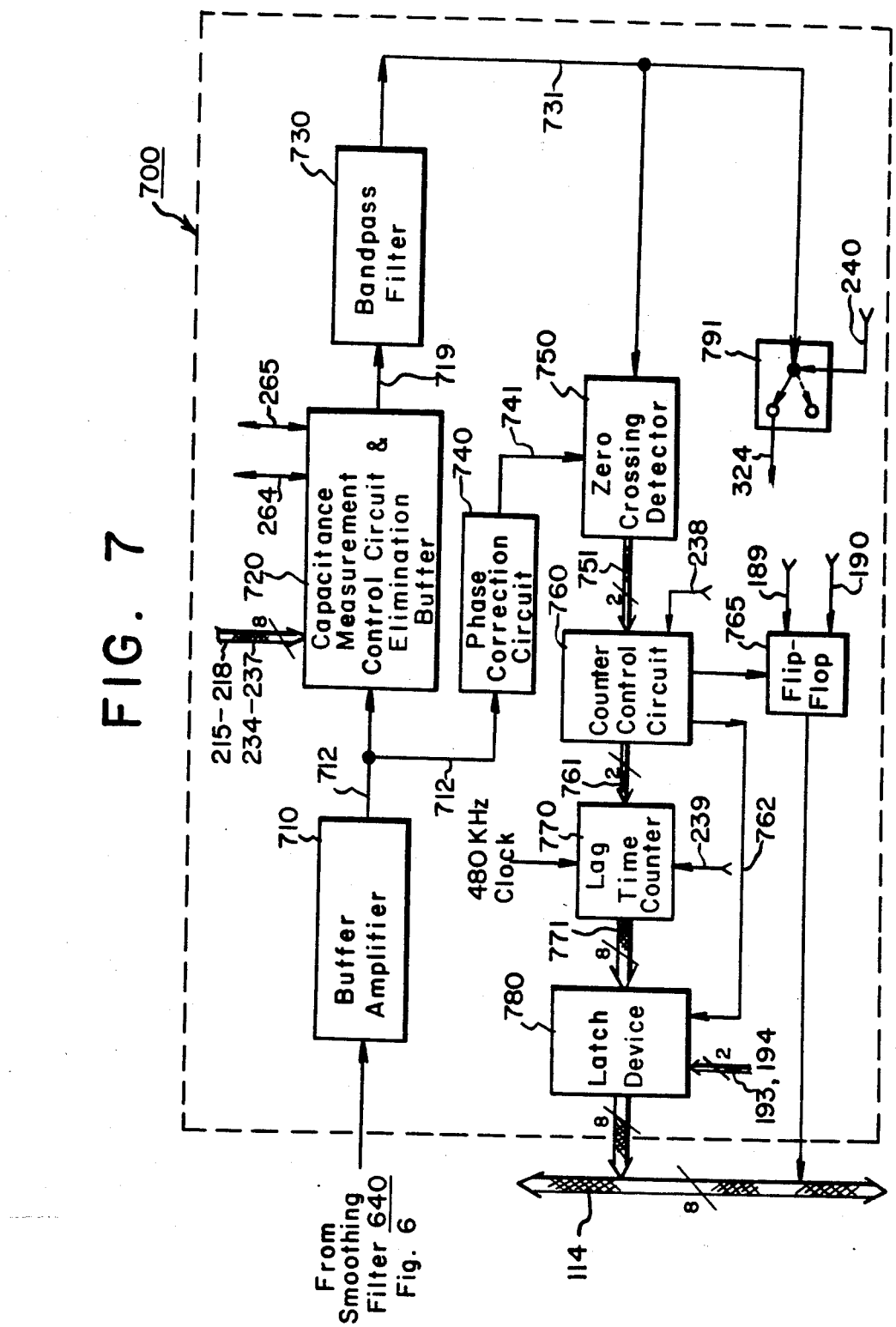
FIG. 7 shows components used to measure capacitance.

Line 641 couples the filtered signal to level select device 680, and to a buffer amplifier 710, shown in FIG. 7. Level select circuit 680 is controlled by lines 211-214, and in accordance therewith selects a magnitude level for the tone received over line 641. The resulting tone output is applied by line 334 to relay 330 and is selectively coupled by said relay to transformer coupling circuit 320, as was described above in connection with FIG. 3. In this fashion, a tone generated by the apparatus can be coupled through wire-pair 269 and test circuit select device 260 to TTA interface 250, and through the TTA unit to communication lines.

FIG. 7 shows capacitance measurement circuitry comprising a buffer amplifier 710, a capacitance measurement control circuit and elimination buffer 720, a bandpass filter 730, a phase correction circuit 740, a zero crossing detector 750, a counter control circuit 760, a flip-flop 765, a lag time counter 770, and a latch device 780. To detect phase lag, a low frequency tone such as 30 Hz is generated by the circuitry shown in FIG. 6, and is coupled through line 641 and buffer 720 to one lead of a telephone line wire pair 264, 265. The phase difference between the coupled signal and the raw 30 Hz tone is then measured using counter 770. Note that tones at other frequencies could be used, however, higher frequencies tend to be more susceptible to interference from ordinary 60 Hz power sources and lower frequencies tend to require longer sampling periods in order to detect phase lag.

Figure 8:
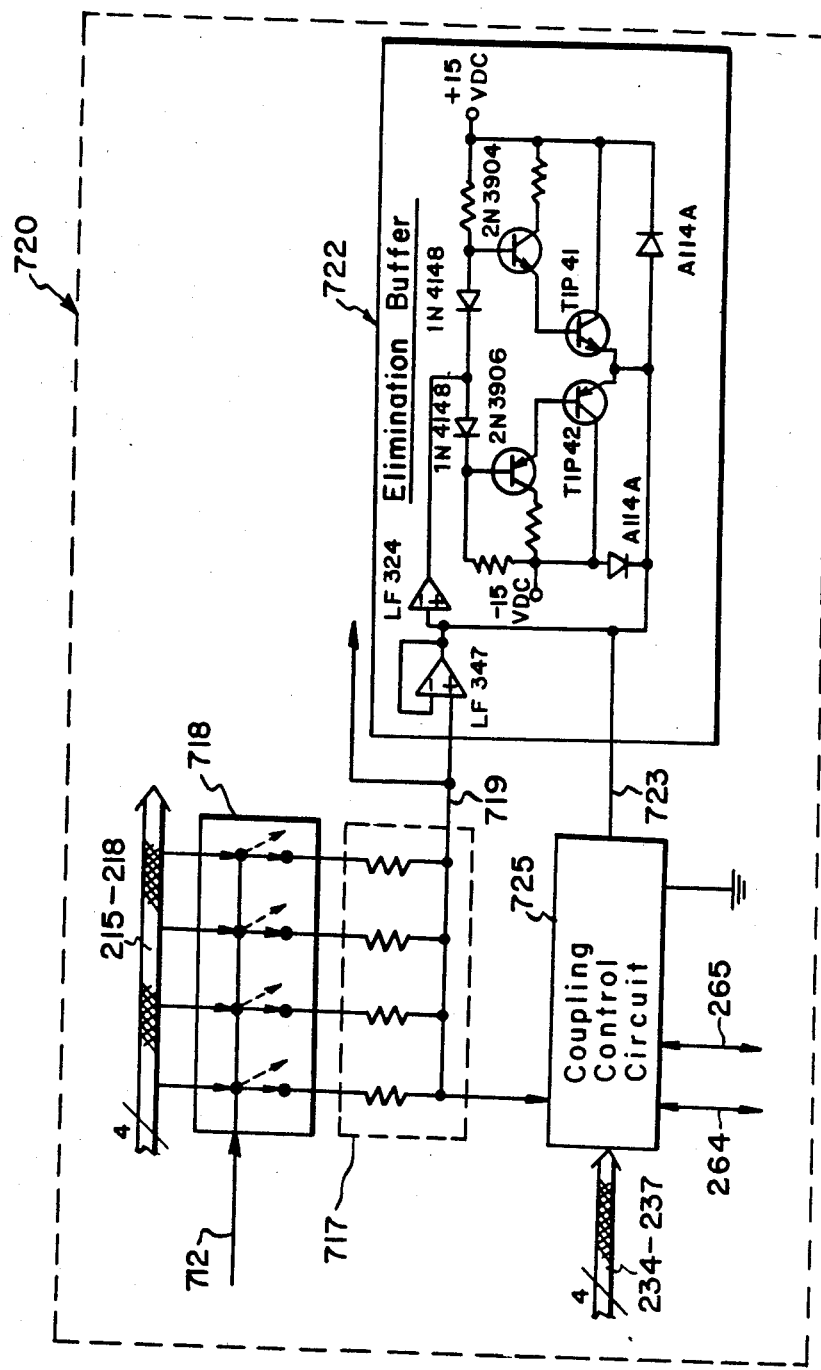
FIG. 8 depicts coupling and buffering elements of the capacitance measurement circuit.

Buffer amplifier 710, is preferably constructed using 2N3906, 2N3904, TIP41 and TIP42 type transistors and, two A114A diodes and two 11N4148 diodes coupled together to form a circuit identical to elimination buffer 722 of FIG. 8, with the exception of operational amplifiers LF347 and LF324. It amplifies a received tone and couples it to capacitance measurement control circuit and elimination buffer 720 as well as to phase correction circuit 740. This amplifier supplies a signal having a greater current than the signal output from smoothing filter 640, and will permit detection of large capacitance levels, as will be more fully described below. Note that the signal output from amplifier 710 has a voltage, illustratively 8 volts, such that ringer circuits on a communication line will not be energized when the signal is coupled with such a line. FIG. 8 shows the capacitance measurement control circuit and elimination buffer 720 in greater detail.

As shown in FIG. 8, the presently preferred embodiment of capacitance measurement control circuit and elimination buffer 720 comprises four resistors 717 having resistances of 1.5 K, 5.11 K, 15 K and 150 K ohms, four single pole single throw relays 718 controlled by lines 215-218, a coupling control circuit 725, and an elimination buffer 722. Coupling control circuit 725 comprises six single pole single throw relays operated by lines 234-237. Elimination buffer 722 can be constructed as shown in FIG. 8 with LF347 and LF324 operational amplifiers, 2N3906, 2N3904, TIP42 and TIP41 type transistors, two A114A diodes and two 2N148 diodes.

As illustrated by FIG. 8, one pole of each of relays 718 is coupled to line 712 and the other pole is coupled to first terminal of one of resistors 717. The other terminal of each resistor is coupled to line 719. These resistors dictate the current supplied by amplifier 710 of FIG. 7 to allow for detection of different capacitance levels. They also isolate the 30 Hz signal on line 712 from phase shift introduced by the next stage of the circuit. Both elimination buffer 722 and coupling control circuit 725 are also coupled to line 719. Buffer 722 receives an input signal from line 719 and outputs a signal of equal voltage level on line 723. The six relays of coupling control circuit 725 selectively couple line 719 to either line 264 (nominally tip) or 265 (nominally ring), line 723 to either line 264 or line 265 or lines 264 and 265 to a ground potential. When line 264 or 265 is coupled to line 719, the capacitance of the coupled line introduces phase delay into signals applied to it. Accordingly, the capacitance of line 264 or 265 can be determined as detailed below from the detected phase delay.

Referring once again to FIG. 7, line 719 is coupled to bandpass filter 730, which is a high order elliptical filter for removing all frequencies above 40 Hz, whereby extraneous frequencies such as 60 Hz carrier current signals are eliminated. Bandpass filter 730 is of typical design and can be easily constructed by one ordinarily skilled in the art using readily available parts. The output of said filter is applied to zero crossing detector 750 over line 731. Also supplied to detector 750 is the output of phase correction circuit 740, which introduces a phase shift into the signal it receives over line 712 in order to correct for phase lag introduced into the signal by filter 730.

The zero crossing detector, which essentially comprises four LM339 operational amplifiers, detects when signals received from line 731 and from phase correction circuit 740 are at 0° and 180°. Zero crossing detectors are easily constructed using operational amplifiers, as is shown in P. Horowitz and W. Hill, "The Art of Electronics," Cambridge University Press 1980, pp. 134–35. Phase delay measurements are made by activating counter 770 when the signal from phase correction circuit 740 crosses zero and stopping counter 770 when the signal from line 731 crosses zero.

Advantageously, several such measurements are made and averaged for accuracy. One line of two wire line 751 carries a start count signal to counter control circuit 760 and the other line carries a stop count signal. When enabled by a signal on line 238, counter control circuit 760 generates control signals to operate lag time counter 770. Control circuit 760 also counts the number of phase delays measured and supplies a control signal to flip-flop 765, which retains a bit of status information indicating whether an overflow has occurred. This overflow information can be used, for example, to adjust the current supplied through resistors 717. One line of data bus 114 is used to convey this bit to microprocessor 110. Control circuit 760 comprises a 7490 decade counter which is incremented every time a phase delay is measured and flip-flop devices for storing the start and stop control signals and supplying them to counter 770. Lag time counter 770 comprises four cascaded 74161 four-bit counters which count 960 KHz clock cycles in the internal between the time they are activated when the signal on line 741 crosses zero and the time they are stopped when the signal on line 731 crosses zero. Latch device 780, comprising two 74374 devices, accepts 16 bits of data from counter 770 when strobed by line 762 and couples said value 8 bits at a time to microprocessor 110 over data bus 114 when directed to do so over lines 193 and 194. Counter 770 can be cleared using line 239. Control lines 189 and 190 supply output enable and clear signals, respectively to flip-flop 765.

Also shown in FIG. 7 is relay 791, which supplies said signal to line 324 when an appropriate control signal appears on line 240.

The operation of capacitance measurement circuit 700 is as follows. Two measurements are taken to determine the level of capacitance on a line: phase lag detection and amplitude loss measurement.

As was the case with resistance measurement, discussed above, capacitance is tested using delta configurations of tip-to-ground (T-G), ring-to-ground (R-G), and tip-to-ring (T-R). For the T-G measurement, a 30 Hz signal is supplied over line 641 to buffer amplifier 710 where it is amplified and applied to line 712. In accordance with control signals provided by lines 215–218, one of relays 718, shown in FIG. 8, couples the signal to one of resistors 717. Then, under the control of signals provided by lines 234–237, relays in coupling control circuit 725 couple the signal to line 264, which is ultimately coupled to a tip wire by the circuitry shown in FIG. 3. The capacitance on the tip wire produces a measurable phase difference between the raw 30 Hz tone and the impeded signal present on line 719.

A measurement of the phase lag in a T-G configuration would ordinarily result in a measurement not only of the effect of T-G capacitance but also of the effect of capacitance on the parallel dependent leg, namely R-G. Elimination buffer 722 of FIG. 8 is used to cancel the unwanted capacitance. Buffer 722 produces a signal which is equal in voltage to the signal produced when the 30 Hz tone is coupled to a tip lead. The output of the buffer is coupled over line 723 to coupling control circuit 720 which in turn couples the signal to line 265 (nominally ring). This results in the elimination of the effect of the dependent leg (R-G) capacitance on the 30 Hz signal, as shown below.

Assume $V_1$ represents the voltage between tip and ground and $V_2$ represents the voltage between ring and ground. The output of whichever one of resistors 717 was selected is a current source ($I_o$) which is applied to the tip node (T) and which divides between T-R and T-G as follows:

$$I_o = \frac{V_1}{\frac{1}{JwC_{TG}}} + [V_1 - V_2]\frac{1}{\frac{1}{JwC_{TR}}} =$$

$$V_1[JwC_{TG}] + [V_1 - V_2]JwC_{TR}$$

where $C_{TG}$ is the tip-to-ground capacitance and $C_{TR}$ is the tip-to-ring capacitance.

Figure 9:
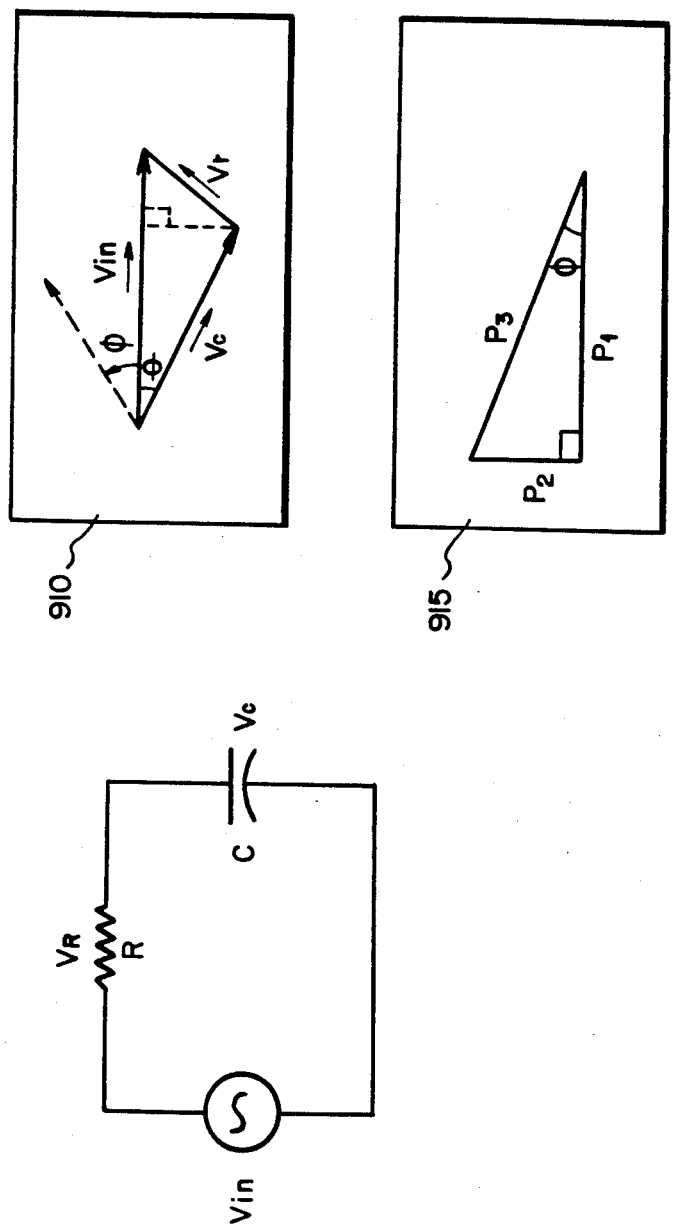
FIG. 9 illustrates derivation of capacitance value from phase delay and amplitude loss.

From the above equations, it is apparent that current flow from tip to ring can be eliminated if $V_1 = V_2$. Accordingly, when control circuit 725 couples the signal on line 719 to one lead 264 of the communication line, the same signal is coupled through eliminating buffer 722 to the other lead 265 of the communication line. Once the dependant leg R-G capacitance is eliminated, the remaining capacitance, in series with the resistance of the resistor selected from resistors 717, as shown in FIG. 9, can be analyzed as a low pass filter circuit.

The above also holds true for measurements of capacitance between ring and ground (R-G), which are obtained by driving ring with the 30 Hz tone while driving tip with the output of buffer 722. T-R measurements, however, are made using a different procedure. The 30 Hz tone is coupled to either a tip or ring lead, as described above, while the non-coupled lead is grounded. Buffer 722 is not used. The resulting measurement reflects tip-to-ground capacitance as well as tip-to-ring capacitance. However, since we already know what tip-to-ground (T-G) capacitance is, it is trivial to derive tip-to-ring capacitance by subtracting out said T-G value. Note that in the illustrative embodiment, the testing unit measures phase lag and amplitude loss and sends the results to the supervisor where capacitance values are calculated as illustrated below.

Phase lag is counted in the following manner. When zero crossing detector 750 senses that the corrected signal from phase correction circuit 740 is 0° (360°) or 180° through its cycle it provided a start signal over one of the two wires of line 751 to counter control circuit 760. This signal causes lag counter to begin counting 180° through its cycle it provides a start signal over one of the two wires of line 751 to counter control circuit 760. This signal causes lag counter to begin counting clock pulses received from the 960 KHz clock. Detector 750 provides a stop signal on the other of lines 751 when the signal presented by line 731, which includes the effect of line capacitance, is at 0° (360°) or 180°. This causes the counter control circuit to stop the counting operation of counter 770. After a given number of intervals have been measured, illustratively ten, latch device 780 is operated using line 762 to store the counter value. Because the frequency of the signals received from lines 731 and phase correction unit are known, i.e. 30 Hz, the processor can sample the latch device approximately 333 milliseconds after the counter control is enabled using line 238. The processor then reads the count value and computes average phase lag therefrom.

To measure amplitude loss the signal on 719 that results when the 30 Hz tone is applied to a tip or ring wire is filtered by bandpass filter 730 and then coupled through relay 791 to line 324. Said line supplies the filtered signal to the AC voltage measurement circuitry shown in FIGS. 4 and 5, where the RMS value of the signal's amplitude is determined by converter and measured by A/D converter 400. This value can then be compared to a RMS value of the amplitude of a 30 Hz tone which is not impeded by line capacitance in order to determine the loss caused by the capacitance of the communication line. In the presently preferred embodiment this reference value is computed for every line capacitance test.

After the amount of phase difference and amplitude loss are measured, the testing unit conveys this data to the supervisor unit, which can then determine capacitance as shown below and in FIG. 9.

FIG. 9 shows calculations used to determine capacitance T-G from amplitude loss and phase delay after buffer 722 has eliminated the effect of capacitance R-G. In the following discussion, $V_{in}$ equals the 30 Hz signal applied to one of resistors 717, $V_c$ is the voltage T-G, R and $V_r$ are the resistance of said resistor and the voltage across it, respectively. Vector diagram 910 shows how $V_r$ is derived from $V_{in}$ and $V_c$, representing the reference and sampled RMS values of amplitudes, respectively. In accordance with the vector diagram:

$$|V_r|[\cos \phi + j\sin \phi] = |V_{in}|[\cos 0 + j\sin 0] - |V_c|[\cos \theta + j\sin \theta]$$

and therefore $$V_r \angle \phi = |V_{in}| - |V_c|\cos\theta + |V_c|j\sin\theta.$$

$$|V_r \angle \phi = |V_{in}| - |V_c|\cos \theta + |V_c|j\sin \theta.$$

From the above equations, three vectors shown in vector diagram 915 can be derived as follows:
Let $$P1 = |V_{in}| - |V_c|\cos \theta$$

$$P2 = |V_c|j\sin \theta$$

$$P3 = \text{hyp}[P1, P2] = |V_r|$$

Where $\phi = \arctan P_2/P_1$.

From these relations, the current ($I_c$) through the capacitance C is given by $C = P3/R$ and impedence $Z_c$ of of the capacitance is given by $Z_c = V_c/I_c$.

Hence the capacitance T-G, is $C = \frac{1}{2}\pi f Z_c$.

While the invention has been described inconnection with specific embodiment, it is evident that numerous alternatives, modifications, and variations will be apparent to those skilled in the art in light of the foregoing description.

We claim:

1. An apparatus for testing communication lines comprising:
   means for coupling said apparatus to a communication line;
   current divider means for producing a voltage drop across a known resistance wherefrom AC and DC current can be measured, said current divider means having an input connected to said coupling means;
   a first path, selectively by-passing said current divider means;
   means for performing a C-weighting operation upon a signal, said means having an input selectively coupled to an output of said current divider means and to said first path;
   a second path, selectively by-passing said means for performing a C-weighting operation;
   means for converting a first signal to a second signal having a voltage equal to an rms value of said first signal, said means having an input for said first signal selectively coupled to an output of said means for performing a C-weighting operation and to said second path;
   a third path, selectively by-passing said converting means;
   an analog to digital conversion means having an output coupled to a digital output line for converting an analog signal to a digital value and supplying said value to said digital output line; and
   control means for selectively connecting an input to said analog to digital conversion means to said coupling means, an output of said current divider means, said C-weighting means or said converting means;
   whereby DC voltage and current, AC voltage and current and C-weighted noise measurements are selectively made.

2. The apparatus of claim 1 further comprising:
   means for selectively generating a constant current having an output coupled selectively to one wire of said communication line by said coupling means;
   whereby a constant current is selectively coupled to one wire of said communication line thereby producing a voltage level on said communication line from which resistance measurements of said communication line are derived.

3. The apparatus of claim 1 further comprising:
   voltage divider means in said first path; and
   means for selecting one of a plurality of voltage divider ratios for dividing an input voltage signal applied to said voltage divider.

4. The apparatus of claim 1 wherein said control means comprises a microprocessor, memory, and a means for performing communications and input/ouput functions.

5. The apparatus of claim 1 further comprising:
   means for generating a tone signal that will not energize load coils present on said communication line when said tone is coupled to said line;
   means for selectively coupling said tone to a first wire of said communication line thereby producing a capacitance impeded signal;
   means for generating from said capacitance impeded signal a buffered signal having a same voltage level as said capacitance impeded signal;
   first means for detecting zero crossings of said tone signal;
   second means for detecting zero crossings of said tone signal;
   means for measuring an interval between the zero crossings of said tone signal and said capacitance impeded signal;
   means for selectively coupling said buffered signal to a second wire of said communication line such that capacitance between said first wire and said second wire does not affect said interval between said zero crossings of said tone signal and said capacitance impeded signal;

whereby a measurement is made of a phase difference between the tone signal and a signal having a phase delay due to the capacitance on one wire of a communication line.

6. The apparatus of claim 5 wherein the frequency of said tone is between 25 Hz and 35 Hz.

7. The apparatus of claim 1 further comprising:
a bandpass filter for eliminating frequencies above and below a band of frequencies, said filter being connected in series between said current divider and said means for performing a C-weighting operation;
a fourth path, selectively by-passing said bandpass filter;
a notch filter for eliminating a given band of frequencies from a tone received from said communication line, said filter being connected in series between said bandpass filter and said means for performing a C-weighting operation; and
a fifth path, selectively by-passing said notch filter;
whereby residual noise can be measured, extraneous signals can be eliminated and speech can be detected.

8. The apparatus of claim 7 further comprising:
means for selectively generating a plurality of tones; and
means for selectively coupling a tone to a communication line connected to said means for coupling a communication line to said apparatus.

9. A method for obtaining values used to determine resistance of a communication line which comprises:
coupling a constant current to a first wire of a communication line while applying a ground potential to a second wire of said communication line, and measuring a voltage drop resulting therefrom to obtain a first resistance measurement;
coupling a constant current to said second wire of said communication line while applying a ground potential to said first wire and measuring a voltage drop resulting therefrom to obtain a second resistance measurement; and
coupling said first and second wires together, coupling a constant current to said first wire and obtaining a third resistance measurement.

10. A method for testing communication lines comprising:
transmitting signals to and receiving signals from a communication line;
producing a voltage drop across a known resistance wherefrom AC and DC current can be measured;
performing a C-weighting operation upon a signal;
converting a first signal to a second signal having voltage equal to an rms value of said first signal;
converting an analog signal to a digital value; and
selectively coupling signals between components which performs said transmitting and receiving, produce said voltage drop, perform said C-weighting, convert said first signal to said second signal and convert said analog signal.

11. An apparatus for detecting capacitance on a communication line comprising:
means for coupling said apparatus to a communication line;
means for generating a tone signal which will not energize load coils present on said communication line when said tone signal is applied to said line;
means for coupling said tone signal to a first wire of a communication line and producing thereby an impeded signal;
means for producing from said impeded signal a buffered signal having a voltage equal to said impeded signal;
means for coupling said buffered signal to a second wire of a communication line; and
means for obtaining a phase difference between said tone signal and said impeded signal;
whereby said phase difference reflects capacitance between said first wire and ground and not capacitance between said first and second wires.

12. The apparatus of claim 9 wherein said tone signal is between 25–35 Hz.

13. An apparatus for testing communication lines comprising:
means for coupling said apparatus to a communication line;
current divider means for producing a voltage drop across a known resistance wherefrom AC and DC current can be measured, said current divider means having an input connected to said coupling means;
a path, selectively by-passing said current divider means;
means for converting a first signal to a second signal having a voltage equal to an rms value of said first signal, said means having an input for said first signal selectively coupled to an output of said current divider means and to said path;
an analog to digital conversion means having an output coupled to a digital output line for converting an analog signal to a digital value and supplying said value to said digital output line; and
control means for selectively connecting an input to said analog to digital conversion means to said coupling means, an output of said current divider means or said converting means;
whereby DC voltage and current, AC voltage and current measurements are selectively made.

14. The apparatus of claim 13 further comprising:
means for generating a tone signal that will not energize load coils present on said communication line when said tone is coupled to said line;
means for selectively coupling said tone to a first wire of said communication line thereby producing a capacitance impeded signal;
means for generating from said capacitance impeded signal a buffered signal having the same voltage level as said capacitance impeded signal;
first means for detecting zero crossings of said tone signal;
second means for detecting zero crossings of said capacitance impeded signal;
means for measuring an interval between the zero crossings of said tone signal and said capacitance impeded signal;
means for selectively coupling said buffered signal to a second wire of said communication line such that capacitance between said first wire and said second wire does not affect said interval between said zero crossings of said tone signal and said capacitance impeded signal;
whereby a measurement is made of a phase difference between the tone signal and a signal having a phase delay due to the capacitance on one wire of a communication line.

* * * * *